May 6, 1947.                J. L. ANDERSON                2,419,983
                          TORCH CUTTING MACHINE
                            Filed June 18, 1943                4 Sheets-Sheet 1

FIG. 1.

INVENTOR
James L. Anderson
BY
ATTORNEYS

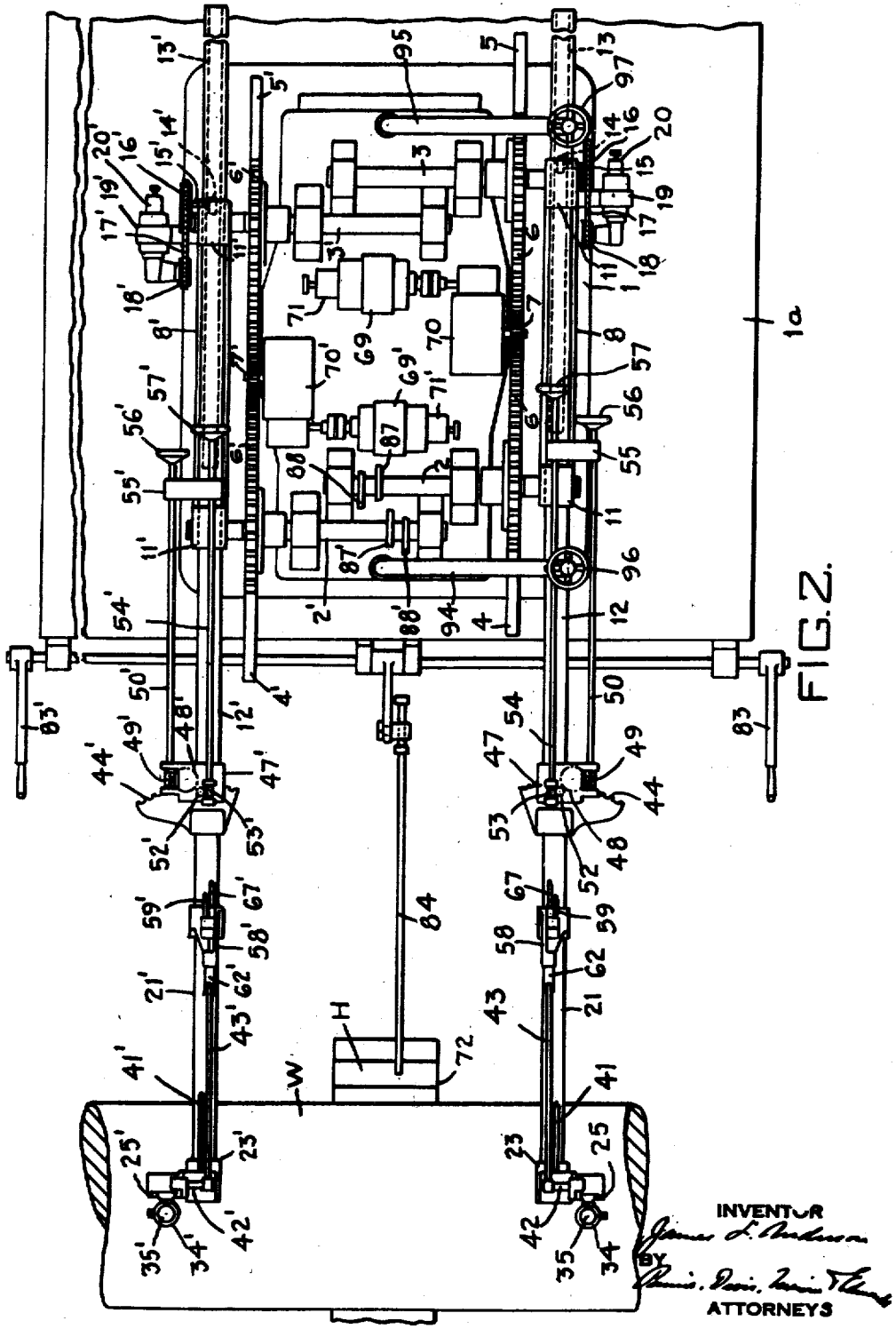

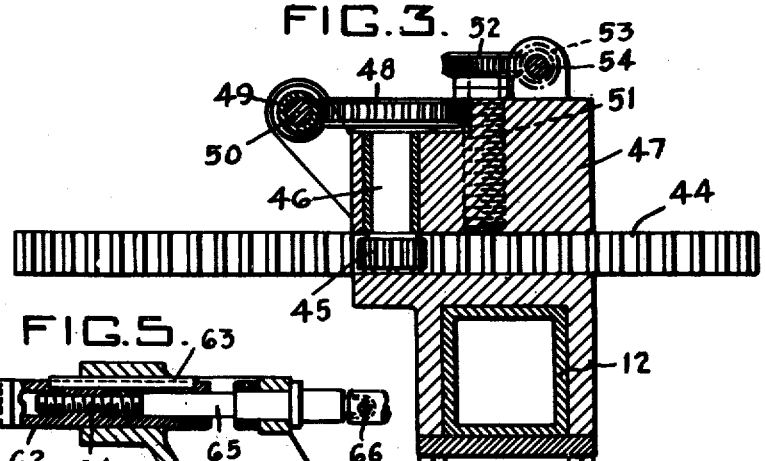
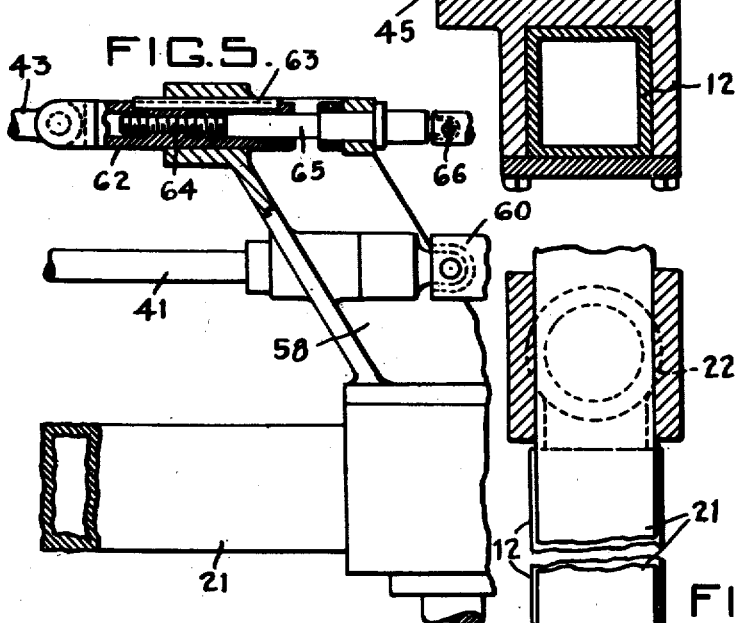
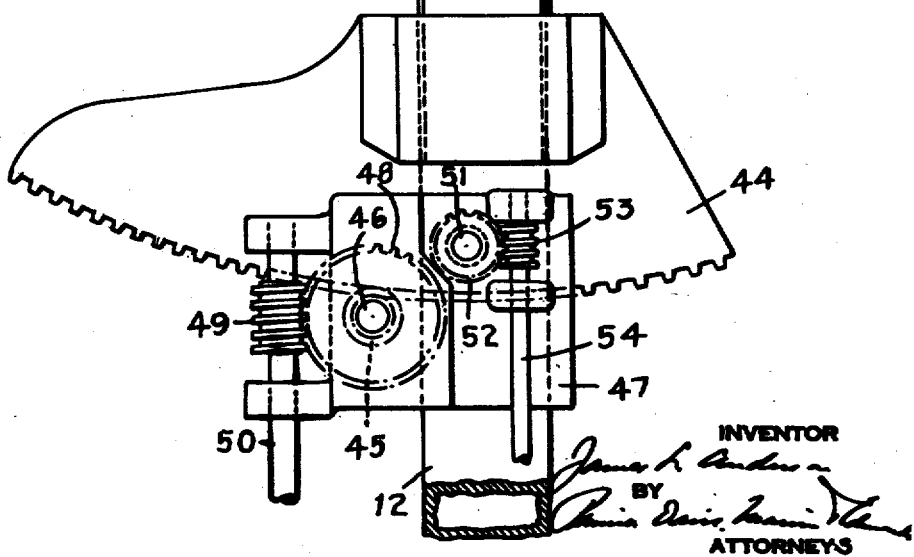

May 6, 1947.   J. L. ANDERSON   2,419,983
TORCH CUTTING MACHINE
Filed June 18, 1943   4 Sheets-Sheet 4
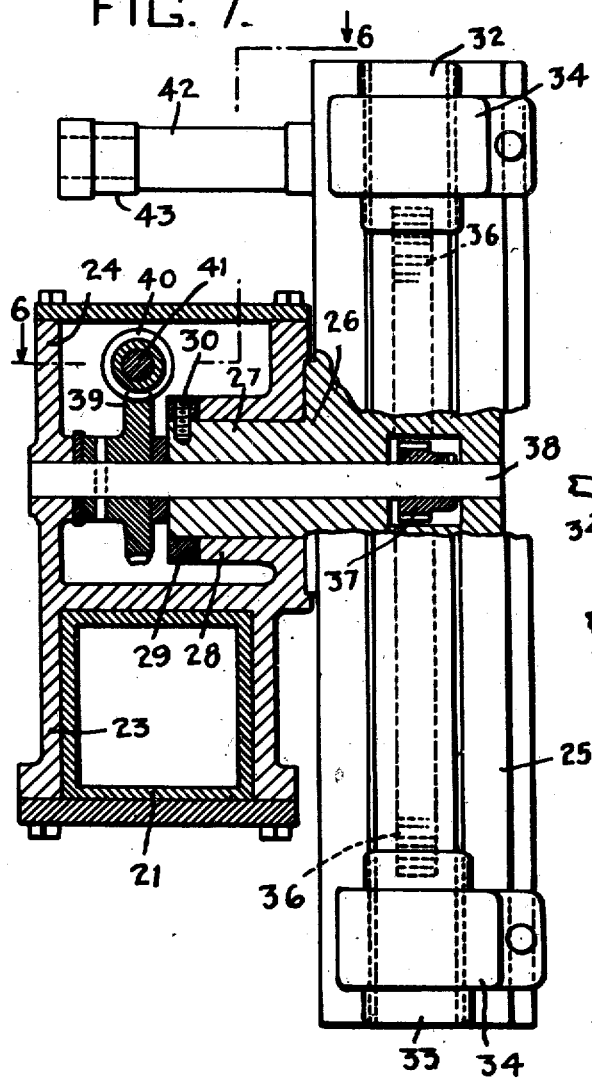
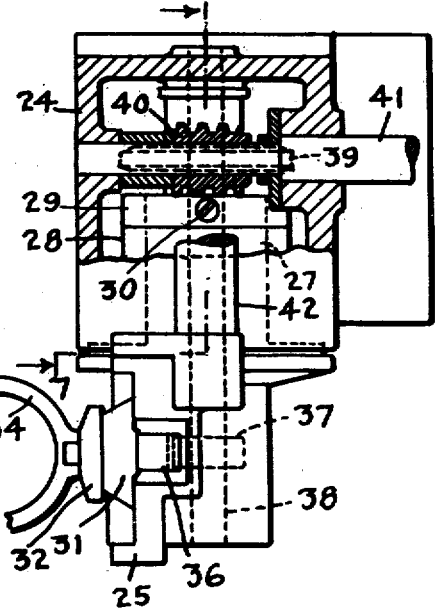
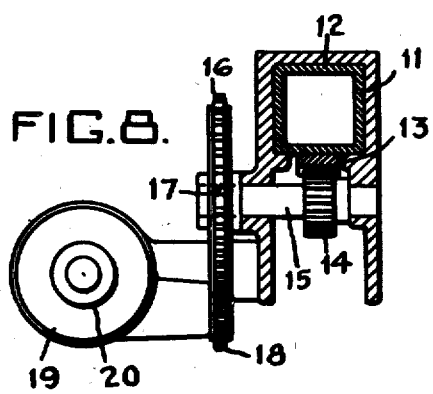
INVENTOR
James L. Anderson
BY
ATTORNEYS Patented May 6, 1947

2,419,983

UNITED STATES PATENT OFFICE 2,419,983

TORCH CUTTING MACHINE

James L. Anderson, Closter, N. J., assignor to Air Reduction Company, Incorporated, a corporation of New York Application June 18, 1943, Serial No. 491,290

12 Claims. (Cl. 266—23)

This invention relates to apparatus for cutting metal by means of gas cutting torches, and more particularly to apparatus adapted to cut round ingots or billets by moving a cutting torch transversely across the same.

Machines for this purpose have been proposed in which the tip of the cutting torch is caused to move in a predetermined arcuate path corresponding substantially to the circumference of the work-piece, by the machine itself and without being guided by the work-piece, so that the torch tip follows the contour of the work-piece and is kept at a substantially uniform distance from its surface. My machine is of this general type but embodies the various improvements hereinafter described.

The improvements make possible a machine of better mechanical design and one which is especially adapted for cutting ingots of large size and ingots at elevated temperatures where so much heat is present or generated that it is not possible for the operator to stand close to the work. In the improved machine all of the desirable adjustments of the torch may be made by the operator at a location sufficiently remote from the work to make the heat unobjectionable to the operator. Other desirable adjustments, not possible in machines heretofore proposed, are provided for in my machine.

The machine is so constructed that it is not limited in its use to the cutting of round workpieces but may be used for other cutting and particularly heavy cutting. For instance it may be used to cut work-pieces having a flat horizontal upper surface.

A machine constructed in accordance with the invention is illustrated in the accompanying drawings, in which:

Figure 1 is a side elevation of the machine;

Fig. 2 is a plan view of the machine shown in Fig. 1;

Fig. 3 is a vertical section taken on the line 3—3 of Fig. 1;

Fig. 4 is a plan view of that portion of the machine where the section 3—3 of Fig. 1 is taken;

Fig. 5 is an enlarged detail view of that portion of the machine where the universal joints in the control rods are located;

Fig. 6 is a plan view of the torch holder and the adjacent casing containing the gearing for swinging the torch holder about a horizontal axis, a portion of such casing being shown in horizontal section taken approximately on the line 6—6 of Fig. 7 to expose the interior mechanism;

Fig. 7 shows the torch holder and the adjacent gear casing partly in vertical elevation and partly in vertical section, the gear casing being represented in vertical section taken approximately on the line 7—7 of Fig. 6, and a portion of the torch holder slide and its guide being broken away to show the pinion which drives the rack on the torch holder slide; and Fig. 8 is a transverse vertical section taken on the line 8—8 of Fig. 1.

The machine has a base 1 mounted on a foundation or pedestal 1a. The base rotatably supports two axles 2 and 3. At the near side of the machine, as viewed in Fig. 1, there is a pair of discs 4, 5, the disc 4 being mounted on the axle 2 and the disc 5 being mounted on the axle 3. Each of the discs has peripheral gear teeth 6, and a common pinion 7 meshes with the teeth of both discs. The discs 4 and 5 have the same pitch diameter and when the pinion 7 is rotated by a motor as hereinafter described, the discs 4 and 5 are driven in the same direction and at the same speed by the pinion. As will hereinafter appear the discs 4 and 5 never rotate much more than one-half of a revolution and therefore it is not necessary for the gear teeth on the discs to extend around their entire circumference.

The discs 4 and 5, and the parts hereinafter described which are driven by them, are duplicated at the opposite side of the machine, as shown in Fig. 2, so that the ingot or billet may be cut at two places simultaneously if desired. Except for the necessary reversals the parts at the two sides of the machine are the same in construction and therefore only the parts at the near side of the machine, as viewed in Fig. 1, will be described in detail.

A connecting rod 8 is pivotally attached at its ends to the discs 4 and 5 by means of pins 9 and 10 which are received in openings in the discs. The opening for the pin 9 is the same distance from the center of the disc 4 that the opening for the pin 10 is from the center of the disc 5. Therefore, when the discs 4 and 5 are rotated by the pinion 7 the connecting rod 8 moves in an arcuate path and always remains horizontal.

The connecting rod 8 has slide bearings 11 at its opposite ends in which a square bar 12 is movable longitudinally. The bar 12 has a rack 13 along its lower surface which meshes with a pinion 14 (see also Figs. 2 and 8) carried by a shaft 15 (Fig. 8) rotatably mounted in the slide bearing 11 nearest the rear of the machine. The outer end of the shaft 15 has a sprocket 16 which is driven by a chain 17 passing over the sprocket and over a driving sprocket 18 driven by an electric motor 19. This motor may also be mounted on the slide bearing 11. The motor 19 has an adjustable centrifugal speed governor 20 which may be of the type shown in the patent to C. T. Evans, No. 2,032,743. When the motor is energized, the bar 12 is caused to move in its slide bearings 11 at a slow uniform speed depending upon the adjustment of the centrifugal governor. This movement of the bar is either to adjust the torch position or to cause the torch to traverse the work during the cutting operation when cutting a work-piece having a flat upper surface as hereinafter described.

A torch arm 21, preferably square in cross-section, is pivotally supported at the end of the bar 12 in a bearing 22 so that the arm is capable of limited swinging movement in a horizontal plane. The outer end of the torch arm has clamped to it a casting 23 (see also Fig. 7), the upper portion of which constitutes a gear casing 24 (Figs. 6 and 7). A vertically disposed guide 25, for the torch holder slide hereinafter described, has a sleeve 26 projecting from its rear which is provided at its inner end with a hub portion 27. This hub portion extends into the gear casing 24 and is rotatably supported therein by means of a bearing member 28. A retaining ring 29 secured to the inner end of hub portion 27 by a set screw 30 abuts against the inner end of the bearing member 28 and prevents outward axial movement of the hub portion 27.

A torch holder slide 31 is mounted in the guide 25. Blocks 32 and 33 are fastened to the slide near its upper and lower ends and to each of these blocks there is welded a torch holder ring 34. A gas cutting torch 35, such as an oxyacetylene cutting torch, is clamped in the rings 34, as best shown in Fig. 1. The rear of the torch slide 31 carries a rack 36 which meshes with a pinion 37 fixed to a horizontal shaft 38. As best shown in Fig. 7 the shaft 38 is journaled in the gear casing 24 and extends outwardly through the sleeve 26 to which the guide for the torch slide is secured. Within the gear casing 24 the shaft 38 carries a worm wheel 39 which meshes with a worm 40 mounted on the end of a shaft 41. This shaft is journaled at one end in the gear casing 24 and extends rearwardly therefrom, as best shown in Fig. 1. When the shaft 41 is rotated in the manner hereinafter described the shaft 38 is rotated through the gears 39 and 40 and turns its pinion 37 to actuate the rack 36 carried by the torch slide 31 and thereby adjust the torch slide vertically.

The upper end of the guide 25 for the torch slide has secured to it an inwardly projecting pin 42 (Figs. 6 and 7) to the end of which is pivotally connected a rod 43 (see also Fig. 1). When this rod is shifted longitudinally in the manner hereinafter described the torch guide 25 is adjusted about the axis of the horizontal shaft 38, the hub portion 27 on the torch guide turning in its bearing 28 to permit this.

The inner end of the pivoted torch arm 21 has rigidly secured to it a gear segment 44 (Figs. 1 and 2), the teeth of which mesh with a pinion 45 (see also Figs. 3 and 4) carried at the lower end of a shaft 46 mounted to rotate in a bearing member 47 rigidly clamped to the bar 12. The upper end of the shaft 46 carries a worm wheel 48 meshing with a worm 49 at the forward end of a shaft 50. When the shaft 50 is turned the pinion 45 will actuate the rack 44 to cause swinging movement of the torch arm 21 about its pivotal connection to the bar 12. This is to effect adjustment of the torch lengthwise of the ingot or billet. In order to lock the torch arm 21 in its adjusted position, the bearing member 47 is provided with a threaded vertical locking pin 51. When this pin is turned to lower it, its lower end bears against the upper face of the gear segment 44 and holds it in fixed position. The upper end of the locking pin 51 carries a worm wheel 52 which meshes with a worm 53 at the forward end of a shaft 54.

The shaft 50 for actuating the gear segment 44 extends rearwardly to the operator's station adjacent the base 1. Here the shaft is rotatably mounted in a supporting bracket 55 mounted on the bar 12 (Figs. 1 and 2). A hand wheel 56 on the end of the shaft 50 enables it to be turned by the operator. The shaft 54 which actuates the locking pin 51 also extends rearwardly through the supporting bracket 55 and is provided with a hand wheel 57.

The above described shaft 41, the turning of which effects vertical adjustment of the torch, is rotatably mounted at its rear end in a bearing bracket 58 mounted on the torch arm 21 (Figs. 1 and 5) and is connected to a second shaft 59 by means of a universal joint 60. As best shown in Fig. 1 the shaft 59, like the shafts 50 and 54, extends rearwardly through the supporting bracket 55 and it is provided with a hand wheel 61 at the operator's station.

Longitudinal shifting of the above described rod 43 to effect tilting of the torch about the axis of the horizontal shaft 38 is effected as follows: The rear end of rod 43 is swivelly connected to a sleeve 62 which is adapted to slide longitudinally in the upper end of the bracket 58, as best shown in Fig. 5. The sleeve is prevented from rotating by means of a key 63. It is threaded internally to receive the threaded end 64 of a shaft section 65 which is connected by means of a universal joint 66 with a shaft 67. The rear end of the shaft 67 is rotatably supported in the supporting bracket 55 and is provided with a hand wheel 68 at the operator's station. When the hand wheel 68 is turned, the threaded end 64 of the shaft-section 65 will turn in the sleeve 62 and cause the sleeve to move longitudinally and thereby shift the rod 43 longitudinally to adjust the torch about the axis of the horizontal shaft 38. The universal joints 60 and 66 allow the torch arm 21 to change its angular relation with respect to the bar 12 and make it possible to adjust the torch by means of the hand wheels 61 and 68 in any angular position of the torch arm 21 with respect to the bar 12.

The pinion 7 which drives the discs 4 and 5 is driven from an electric motor 69 (Fig. 2) through a gear reduction unit 70. The motor has an adjustable centrifugal speed governor 71 which may be similar to that with which the motor 19 is equipped.

The work-piece indicated at W in Fig. 1, which may be a round ingot or billet, or round stock of any other kind, is supported on an ingot holder H.

In Fig. 1 the parts are shown in the position they occupy when the torch has completed the first half of its travel across the work-piece and is at the highest point of its path of travel. It will be understood that at the beginning of the cutting operation the torch is at either one side or the other of the ingot and is then moved by the machine across the ingot to the other side. If a cut is to be made by movement of the torch to the left as viewed in Fig. 1 then at the beginning of the cutting operation the parts of the machine will be in such a position that the pins 9 and 10, which support the connecting rod 8 on the discs 4 and 5, will lie to the right of axles 2 and 3, respectively, as viewed in Fig. 1. By turning the hand wheel 61 the torch may be adjusted vertically so that the tip of the torch will be spaced the proper distance from the surface of the ingot as the torch moves across the top of the ingot. By turning the hand wheel 68 the torch may be tilted about the axis of the horizontal shaft 38 to change the angle of the cutting jet with respect to the work-piece without changing the plane of the cut. The torch is moved up to the ingot in position to start the cutting operation by starting the electric motor 19. This causes the bar 12 to move longitudinally to the left, as viewed in Fig. 1, with respect to the connecting rod 8, until the torch tip is brought to the proper position adjacent the ingot, whereupon the motor 19 is stopped. Adjustment of the torch lengthwise of the ingot to bring the torch tip to the point along the ingot where the cut is to be made is effected by first turning the hand wheel 57 to raise the locking pin 51, then turning the hand wheel 56 to swing the torch arm 21 in a horizontal plane until the torch tip is brought to the proper position lengthwise of the ingot, and then turning the hand wheel 57 to lower the locking pin 51 to clamp the gear segment 44 against further movement to thereby lock the torch arm 21 in its adjusted position. The motor 69 is then started, and as the discs 4 and 5 slowly rotate, the connecting rod 8 is moved to the left, as viewed in Fig. 1, first upwardly and then downwardly in a semi-circular path while being maintained in a horizontal position. The bar 12 and torch arm 21 are moved with it and the torch tip therefore traverses a semi-circular path corresponding approximately to the circumference of the ingot W, and is caused to move at the proper cutting speed by adjustment of the governor on the motor 69. When the cut is completed the motor 69 is stopped by a hand switch or one of the limit switches referred to below. The connecting rod 8 will then be in such a position that the pins 9 and 10 will lie to the left of the axles 2 and 3, respectively, as viewed in Fig. 1, and the tip of the torch will have been brought to its final position at the left side of the ingot W. When the motor 69 is reversed the parts move in the opposite direction to that just described and the ingot may be cut by movement of the torch across the ingot from left to right, as viewed in Fig. 1.

Limit switches may be employed to de-energize the motor 69 and to stop rotation of the discs 4 and 5 when the torch completes the cut at either side of the ingot and reaches its extreme position. One of such limit switches is indicated in dotted lines at 100 in Fig. 1 behind the disc 4. It may be operated by a cam 87 on the axle 2 when the discs have completed a partial revolution to bring the cutting torch to the end of its stroke. A similar limit switch lies just behind the limit switch 100 and therefore does not show in Fig. 1. It may be operated by a second cam 88 on the axle 2 to stop the motor 69 when the torch reaches the other end of its stroke. The limit switches may be mounted on the under side of a plate 89 supported on the base 1 by posts 90. In Fig. 2 the plate 89 and the limit switches carried by it are removed to show the two cams 87 and 88 on the axle 2. In Fig. 1 another limit switch 100' appears in dotted lines behind the disc 4. This is one of the two limit switches actuated by cams 87' and 88' on the axle 2' which carries one of the discs at the opposite side of the machine. The one plate 89 may support all four of the limit switches.

In Fig. 1 the connecting rod 8 is shown supported by the discs at a pair of pin openings located close to the periphery of the discs and under these conditions the torch moves in the largest arc permissible and is given its maximum stroke. Other pin openings may be provided in each disc located at progressively shorter distances from the center of the disc so that by attaching the connecting rod 8 to the discs at another pair of corresponding openings the torch may be made to move in an arc of smaller radius when it is desired to cut ingots of smaller diameter. In Fig. 1 two additional pin openings are shown in the discs 4 at 92 and 93 and corresponding pin openings are shown in the disc 5 at 92a and 93a, but it will be understood that even more openings may be provided, if desired. When the connecting rod 8 is attached to the discs at the innermost openings 93 and 93a the torch then has an arcuate movement of such radius as to be appropriate for cutting an ingot whose comparative size is represented by the broken-line circle W' in Fig. 1.

In order to facilitate shifting of the connecting rod 8 from one pair of disc openings to another, a pair of davits 94, 95 are provided which may be used for supporting the weight of the connecting rod and all parts carried by it when the shift-over is being made. When it is desired to make the shift the davits are attached to the bar 12, the pins 9 and 10 are removed, and then by turning the discs and vertically adjusting the davits by means of the hand wheels 96 and 97, the pin openings in the connecting rod may be brought into alignment with the desired openings in the discs, whereupon the pins 9 and 10 are reinserted.

As above stated, the parts are duplicated at opposite sides of the machine so that the ingot may be cut simultaneously at two places if desired. Fig. 2 shows the parts at both sides of the machine. The parts at the far side of the machine corresponding to those above described are indicated by the same reference numerals but with a prime mark. The davits 94 and 95 can be swung about their vertical axes to the far side of the machine when it is desired to shift the position of the connecting rod at that side.

The flow of gas to the cutting torches is controlled by valves through handles on a control panel a portion of which is shown at 98 in Fig. 1. The starting of the motors in the desired direction and stopping them, and other operations, are controlled in a manner well understood in the art by push buttons mounted on the control panel. Several sets of push buttons on the control panel are represented at 99.

Since the mechanism at one side of the machine for moving one of the torches operates independently of that at the other side, and the two sets of mechanism are independently controlled, the machine may be used for cutting the ingot at one place only by means of one of the torches or for cutting the ingot at two places simultaneously by means of both of the torches. Moreover, the torches may be moved in unison in the same direction across the ingot or one torch may be moved in one direction across the ingot while the other torch is moved in the opposite direction across the ingot, it being understood that cutting of the ingot may be effected during movement of the torch in either direction. Various desirable adjustments of the torch may be made by the operator by turning the above described hand wheels at a location remote from the torch where the heat from the heated material and that produced by the heavy cutting operation is not objectionable to the operator.

The bar 12 could be adjusted longitudinally with respect to the connecting rod 8 by a hand operated pinion engaging the rack 13, but by utilizing the motor 19 with its centrifugal speed governor for this purpose the machine is thereby rendered capable of cutting flat work-pieces as well as round ones. If a flat work-piece is to be cut, the discs 4 and 5 are rotated only for the purpose of raising and lowering the torch to give it the proper elevation with respect to the surface of the work-piece. During the actual cutting operation the discs are allowed to remain stationary and the motor 19 is employed to move the bar 12 longitudinally in the bearings 11 at the desired uniform speed to effect the cutting stroke of the torch. The torch tip then has a straight horizontal rectilinear movement during the cutting operation instead of an arcuate movement.

I claim:

1. A cutting machine comprising a pair of rotary discs, means for rotating the discs, a connecting rod pivotally connected at opposite ends to the discs so that it is moved in an arcuate path during rotation of the discs and is maintained in a horizontal position, a horizontal bar carried by and extending forwardly from said connecting rod, a torch holder supported by said bar, and means for adjusting said bar longitudinally with respect to the connecting rod.

2. A cutting machine comprising a pair of rotary discs, each disc having gear teeth around at least part of its circumference, a driving pinion meshing with the teeth on both discs to rotate the discs in the same direction and at the same speed, a motor for rotating the pinion, a connecting rod pivotally connected at opposite ends to the discs so that it is moved in an arcuate path during rotation of the discs and is maintained in a horizontal position, a horizontal bar carried by and extending forwardly from said connecting rod, means for adjusting said rod longitudinally with respect to the connecting bar, and a torch holder supported by said bar.

3. A cutting machine comprising a connecting rod, means for moving opposite ends of the connecting rod in arcuate paths at the same speed while maintaining the rod in a horizontal position, slide bearings carried by said connecting rod, a horizontal bar mounted for longitudinal sliding movement in said bearings and extending forwardly from the connecting rod, a torch holder supported by said bar, and means for adjusting said bar longitudinally in said bearings.

4. A cutting machine comprising a connecting rod, means for moving opposite ends of the connecting rod in arcuate paths at the same speed while maintaining the rod in a horizontal position, a horizontal bar carried by and extending forwardly from said connecting rod, a torch arm pivotally mounted on said bar for swinging movement in a horizontal plane, a torch holder carried by said arm, means for adjusting said bar longitudinally with respect to the connecting rod, and means for swinging the torch arm to adjust its angular relation with respect to said bar.

5. A cutting machine comprising a connecting rod, means for moving opposite ends of the connecting rod in arcuate paths at the same speed while maintaining the rod in a horizontal position, a horizontal bar carried by and extending forwardly from said connecting rod, means for adjusting said rod longitudinally with respect to the connecting bar, a torch arm pivotally mounted on said bar for swinging movement in a horizontal plane, a torch holder carried by said arm, means for swinging the torch arm to adjust its angular relation with respect to said bar, and means for locking the torch arm in its adjusted position.

6. A cutting machine comprising a connecting rod, means for moving opposite ends of the connecting rod in arcuate paths at the same speed while maintaining the rod in a horizontal position, a horizontal bar mounted for longitudinal sliding movement on said connecting rod and extending forwardly therefrom, a torch holder supported by said bar, means for moving said bar longitudinally with respect to the connecting rod, and an electric motor for actuating said means, said motor having an adjustable speed governor whereby said bar may be moved by the motor at a uniform speed corresponding to the desired cutting speed of the torch.

7. A machine for cutting round or flat work-pieces by means of a gas cutting torch comprising a pair of rotary discs, means for rotating the discs in the same direction at a uniform speed corresponding to the desired cutting speed of the torch when cutting round work-pieces, a connecting rod pivotally connected at opposite ends to the discs so that it is moved in an arcuate path during rotation of the discs and is maintained in a horizontal position, a horizontal bar mounted for longitudinal sliding movement on said connecting rod and extending forwardly therefrom, a torch holder supported by said bar, means for moving said bar longitudinally with respect to the connecting rod, and an electric motor for actuating said means, said motor having an adjustable speed governor whereby said bar may be moved by the motor at a uniform speed corresponding to the desired cutting speed of the torch when cutting flat work-pieces.

8. A cutting machine comprising a base, a bar extending forwardly from the base, a torch arm pivotally mounted on said bar for swinging movement in a horizontal plane, a torch carried by said arm, means positioned above said base for moving said bar longitudinally to traverse the torch across the work-piece, and adjusting means for swinging the torch arm to adjust its angular relation with respect to said bar, said adjusting means being operable by the operator at a location adjacent said base and remote from the torch.

9. A cutting machine in accordance with claim 8 having locking means for locking the torch arm in its adjusted position also operable by the operator from said location adjacent the base and remote from the torch.

10. A torch cutting machine for transversely cutting ingots and other work-pieces comprising a bar disposed substantially at right angles to the longitudinal axis of the work-piece, means for moving the bar longitudinally at a speed corresponding to the speed at which the torch is to be moved across the work-piece, a torch arm pivotally supported near one end of said bar for swinging movement in a horizontal plane, a torch holder carried by said arm adapted to support a torch substantially perpendicularly for movement across the work-piece, and means for swinging the torch arm about the axis of its pivotal connection to said bar to adjust the torch lengthwise of the work-piece.

11. A torch cutting machine for transversely cutting ingots and other work-pieces comprising a bar disposed substantially at right angles to the longitudinal axis of the work-piece, means for moving the bar longitudinally at a speed corresponding to the speed at which the torch is to be moved across the work-piece, a torch arm pivotally supported near one end of said bar for swinging movement in a horizontal plane, a torch holder carried by said arm adapted to support a torch substantially perpendicularly for movement across the work-piece, means for swinging the torch arm about the axis of its pivotal connection to said bar to adjust the torch lengthwise of the work-piece, and means for locking the torch arm in its adjusted position.

12. A torch cutting machine for transversely cutting round ingots and the like comprising a pair of discs mounted to rotate in a vertical plane, means for rotating the discs in the same direction at a uniform speed corresponding to the speed at which the torch is to be moved across the work-piece, a bar, a torch-holder supported by said bar, each of said discs having a plurality of openings spaced various distances from the center of the disc, and means for pivotally supporting said bar in a pair of corresponding openings in the discs whereby rotation of the discs moves said bar and the torch in an arcuate path whose radius depends upon which pair of corresponding openings in the discs is utilized to support said bar.

JAMES L. ANDERSON.

REFERENCES CITED

The following references are of record in the file of this patent:

UNITED STATES PATENTS

| Number | Name | Date |
|---|---|---|
| 1,687,001 | Bishop | Oct. 9, 1928 |
| 2,283,346 | Bucknam et al. | May 19, 1942 |
| 1,283,795 | Kelley | Nov. 5, 1918 |
| 1,517,251 | Schaaf | Dec. 2, 1924 |
| 1,741,951 | Pelton | Dec. 31, 1929 |
| 1,841,878 | Claude | Jan. 19, 1932 |
| 2,267,405 | Jones et al. | Dec. 23, 1941 |
| 1,176,584 | Madgett | Mar. 21, 1916 |
| 2,182,707 | Shipman | Dec. 5, 1939 |
| 2,054,847 | Anderson | Sept. 22, 1936 |

FOREIGN PATENTS

| Number | Country | Date |
|---|---|---|
| 82,922 | Swiss | 1919 |
| 236,676 | Britain | July 15, 1925 |
| 515,328 | Britain | Dec. 1, 1939 |

Certificate of Correction

Patent No. 2,419,983.

May 6, 1947.

JAMES L. ANDERSON

It is hereby certified that errors appear in the printed specification of the above numbered patent requiring correction as follows: Column 7, line 47, and column 8, line 4, for "said rod" read *said bar*; column 7, line 48, and column 8, line 5, for "bar" read *rod*; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.* nection to said bar to adjust the torch lengthwise of the work-piece.

11. A torch cutting machine for transversely cutting ingots and other work-pieces comprising a bar disposed substantially at right angles to the longitudinal axis of the work-piece, means for moving the bar longitudinally at a speed corresponding to the speed at which the torch is to be moved across the work-piece, a torch arm pivotally supported near one end of said bar for swinging movement in a horizontal plane, a torch holder carried by said arm adapted to support a torch substantially perpendicularly for movement across the work-piece, means for swinging the torch arm about the axis of its pivotal connection to said bar to adjust the torch lengthwise of the work-piece, and means for locking the torch arm in its adjusted position.

12. A torch cutting machine for transversely cutting round ingots and the like comprising a pair of discs mounted to rotate in a vertical plane, means for rotating the discs in the same direction at a uniform speed corresponding to the speed at which the torch is to be moved across the work-piece, a bar, a torch-holder supported by said bar, each of said discs having a plurality of openings spaced various distances from the center of the disc, and means for pivotally supporting said bar in a pair of corresponding openings in the discs whereby rotation of the discs moves said bar and the torch in an arcuate path whose radius depends upon which pair of corresponding openings in the discs is utilized to support said bar.

JAMES L. ANDERSON.

REFERENCES CITED

The following references are of record in the file of this patent:

UNITED STATES PATENTS

| Number | Name | Date |
|---|---|---|
| 1,687,001 | Bishop | Oct. 9, 1928 |
| 2,283,346 | Bucknam et al. | May 19, 1942 |
| 1,283,795 | Kelley | Nov. 5, 1918 |
| 1,517,251 | Schaaf | Dec. 2, 1924 |
| 1,741,951 | Pelton | Dec. 31, 1929 |
| 1,841,878 | Claude | Jan. 19, 1932 |
| 2,267,405 | Jones et al. | Dec. 23, 1941 |
| 1,176,584 | Madgett | Mar. 21, 1916 |
| 2,182,707 | Shipman | Dec. 5, 1939 |
| 2,054,847 | Anderson | Sept. 22, 1936 |

FOREIGN PATENTS

| Number | Country | Date |
|---|---|---|
| 82,922 | Swiss | 1919 |
| 236,676 | Britain | July 15, 1925 |
| 515,328 | Britain | Dec. 1, 1939 |

---

Certificate of Correction

Patent No. 2,419,983.

May 6, 1947.

JAMES L. ANDERSON

It is hereby certified that errors appear in the printed specification of the above numbered patent requiring correction as follows: Column 7, line 47, and column 8, line 4, for "said rod" read *said bar*; column 7, line 48, and column 8, line 5, for "bar" read *rod*; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.*